US008260550B2

(12) United States Patent
Highstrom et al.

(10) Patent No.: US 8,260,550 B2
(45) Date of Patent: Sep. 4, 2012

(54) PRESENTATION OF NAVIGATION INSTRUCTIONS USING VARIABLE LEVELS OF DETAIL

(75) Inventors: Matthew M. Highstrom, South Lyon, MI (US); Andrew W. Gellatly, Macomb, MI (US); Cody R. Hansen, Shelby Township, MI (US); John P. Weiss, Shelby Township, MI (US); Bhavna Mathur, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 540 days.

(21) Appl. No.: 12/487,891

(22) Filed: Jun. 19, 2009

(65) Prior Publication Data

US 2010/0324816 A1 Dec. 23, 2010

(51) Int. Cl.
*G01C 21/00* (2006.01)
(52) U.S. Cl. ........ 701/454; 701/400; 701/436; 701/437; 701/438; 701/455; 701/456; 701/457
(58) Field of Classification Search .................. None
See application file for complete search history.

(56) References Cited

U.S. PATENT DOCUMENTS

| | | | | | |
|---|---|---|---|---|---|
| 4,847,788 | A | * | 7/1989 | Shimada | 345/634 |
| 4,896,148 | A | * | 1/1990 | Kurita | 345/670 |
| 5,283,562 | A | * | 2/1994 | Kaneko et al. | 345/671 |
| 5,303,159 | A | * | 4/1994 | Tamai et al. | 701/210 |
| 5,473,324 | A | | 12/1995 | Ueno | |
| 5,508,930 | A | * | 4/1996 | Smith, Jr. | 701/201 |
| 5,699,056 | A | * | 12/1997 | Yoshida | 340/905 |
| 6,202,026 | B1 | * | 3/2001 | Nimura et al. | 701/211 |
| 6,230,098 | B1 | * | 5/2001 | Ando et al. | 701/208 |
| 6,256,579 | B1 | * | 7/2001 | Tanimoto | 701/201 |
| 6,334,090 | B1 | * | 12/2001 | Fujii | 701/213 |
| 6,452,544 | B1 | * | 9/2002 | Hakala et al. | 342/357.31 |
| 6,819,356 | B1 | * | 11/2004 | Yumoto | 348/231.2 |
| 6,882,931 | B2 | * | 4/2005 | Inoue | 701/201 |
| 7,197,395 | B2 | * | 3/2007 | Kishigami | 701/210 |
| 7,349,800 | B2 | * | 3/2008 | Forlenza et al. | 701/207 |

(Continued)

FOREIGN PATENT DOCUMENTS

DE 4344326 C2 8/1997

(Continued)

OTHER PUBLICATIONS

German Office Action, dated Aug. 31, 2011, for German Patent Application No. 10 2010 023 944.5.

*Primary Examiner* — Khoi Tran
*Assistant Examiner* — Bhavesh V Amin
(74) *Attorney, Agent, or Firm* — Ingrassia Fisher & Lorenz P.C.

(57) ABSTRACT

A navigation system is provided for instructing an operator of a vehicle. The navigation system includes a navigation processor configured to obtain a destination location, and to generate a proposed route to the destination location. The navigation system also includes a presentation element coupled to the navigation processor, the presentation element configured to provide navigation instructions to the operator. A selection module is coupled to or incorporated into the navigation processor, and the selection module is configured to select a cartographic resolution from a plurality of different cartographic resolutions, resulting in a selected cartographic resolution. The presentation element provides navigation instructions for at least a portion of the proposed route, using the selected cartographic resolution.

20 Claims, 5 Drawing Sheets

U.S. PATENT DOCUMENTS

| | | | |
|---|---|---|---|
| 7,353,111 B2 * | 4/2008 | Takahashi et al. | 701/211 |
| 7,584,049 B2 * | 9/2009 | Nomura | 701/210 |
| 7,613,566 B1 * | 11/2009 | Bolton | 701/212 |
| 7,890,256 B2 * | 2/2011 | Han | 701/208 |
| 8,010,285 B1 * | 8/2011 | Denise | 701/210 |
| 2002/0077747 A1 * | 6/2002 | Hijikata | 701/209 |
| 2002/0082771 A1 * | 6/2002 | Anderson | 701/209 |
| 2004/0204849 A1 * | 10/2004 | Shipley et al. | 701/212 |
| 2005/0038595 A1 * | 2/2005 | Yokota et al. | 701/200 |
| 2005/0040939 A1 * | 2/2005 | Jobes et al. | 340/438 |
| 2006/0074553 A1 * | 4/2006 | Foo et al. | 701/212 |
| 2006/0142940 A1 * | 6/2006 | Choi | 701/210 |
| 2007/0067101 A1 * | 3/2007 | Krull et al. | 701/209 |
| 2009/0046111 A1 | 2/2009 | Joachim et al. | |

FOREIGN PATENT DOCUMENTS

| | | |
|---|---|---|
| DE | 10004163 A1 | 8/2001 |
| DE | 102007038464 A1 | 2/2009 |
| EP | 1122517 A2 | 8/2001 |
| EP | 2026038 A2 | 2/2009 |

* cited by examiner

PRESENTATION OF NAVIGATION INSTRUCTIONS USING VARIABLE LEVELS OF DETAIL

TECHNICAL FIELD

Embodiments of the subject matter described herein relate generally to vehicle navigation and route planning systems. More particularly, embodiments of the subject matter relate to a vehicle navigation system that uses different schemes for presenting navigation instructions.

BACKGROUND

The prior art is replete with different types of electronic navigation systems. Some electronic navigation systems are handheld, and others are vehicle-based. A vehicle navigation system generally provides navigation instructions, location data, and map information to the vehicle operator. Some existing vehicle navigation systems attempt to optimize a route based upon different factors. Route calculation is typically performed by examining a number of possible paths, and selecting the "best" path according to a number of optimization rules. For instance, the shortest possible route may be chosen to minimize the distance traveled or high-speed roads may be chosen to minimize travel time. Some advanced navigation systems utilize real-time traffic congestion data in an attempt to guide the vehicle away from traffic jams. After the optimization criteria have been selected, automated vehicle route guidance is typically performed in a two-step process: (1) a proposed route is calculated from a starting position of the vehicle to the desired destination; and (2) guidance instructions are presented to the vehicle operator as the vehicle traverses the proposed route.

Current vehicle navigation systems provide turn-by-turn instructions by default, without considering whether or not the operator actually needs such detailed instructions. The turn-by-turn instructions (which may be displayed and/or generated as audio) continue throughout the planned route until the vehicle has reached its destination, unless the operator disables or mutes the prompts generated by the navigation system. In many situations, the operator will become annoyed or bothered by frequent or unnecessary navigation instructions. As a result, the operator might disable or mute the system, or might subconsciously ignore or disregard the navigation instructions.

BRIEF SUMMARY

A navigation method is provided for instructing an operator of a vehicle with a navigation system. The method begins by obtaining a destination location. The method continues by generating a proposed route to the destination location. First navigation instructions are provided for the proposed route, using a first cartographic resolution. Thereafter, the method provides second navigation instructions for the proposed route, using a second cartographic resolution that is different than the first cartographic resolution.

Another navigation method is provided for instructing an operator of a vehicle with a navigation system. This method monitors driving trends of the vehicle to obtain monitored driving trends, and automatically changes an operating characteristic of the navigation system as a function of the monitored driving trends. The method continues by providing navigation instructions in accordance with the automatically selected operating characteristic.

Also provided is a navigation system for instructing an operator of a vehicle. The navigation system includes a navigation processor, a presentation element, and a selection module. The navigation processor is configured to obtain a destination location, and to generate a proposed route to the destination location. The presentation element is configured to provide navigation instructions to the operator. The selection module is coupled to or incorporated into the navigation processor, and it is configured to select a cartographic resolution from a plurality of different cartographic resolutions. The presentation element provides navigation instructions for at least a portion of the proposed route, using the selected cartographic resolution.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
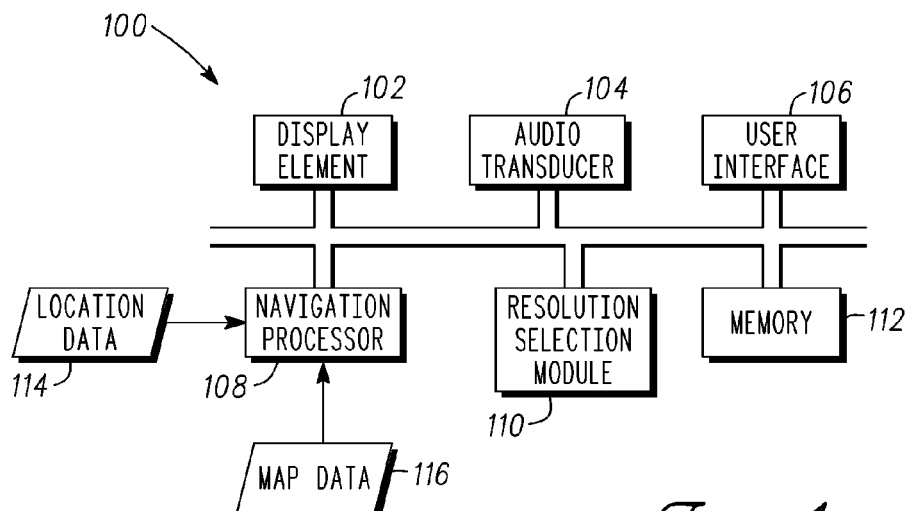
FIG. 1 is a schematic representation of an embodiment of a vehicle navigation system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to signal processing, image processing, data transmission, general vehicle navigation system operation, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

Conventional vehicle navigation systems provide turn-by-turn instructions with no accommodation for any knowledge that the driver might have of the surrounding area or region. Turn-by-turn assistance might continue to annoy the driver with interruptions, even when such assistance is not actually needed—often prompting the driver to disable the system voice prompts. Nor do conventional navigation systems take into consideration any personal route preferences, and such systems tend to recalculate routes regardless of whether the driver is familiar or new to the area.

The systems and methodologies described herein enhance conventional vehicle navigation techniques in several ways. For example, an embodiment of a navigation system could track commonly driven roads, and use such tracking data to determine whether to provide detailed turn-by-turn navigation instructions or less detailed instructions for a road upon which the vehicle is currently travelling. Thus, if the vehicle is in a familiar area, the navigation system might present the option to proceed to the next major artery or driving maneuver (e.g., "Proceed to I-75 North") in lieu of providing detailed and high resolution street-by-street instructions. On the other hand, if the vehicle is in an unfamiliar or unknown area and the driver has selected a destination location that is in a familiar area, the navigation system could present detailed street-level turn-by-turn instructions until the vehicle has entered a familiar region, and thereafter automatically switch to less detailed instructions (e.g., "Continue To Home").

As another example, for complex routes, the navigation system could segment the overall route into high level segments (e.g., between cities, major arteries, or counties) and provide high level instructions to the next segment, while providing the option to display and announce additional detail (such as turn-by-turn) for the current segment if so desired by the driver. An implementation of this option could be realized using a collapsed screen view that shows the main artery maneuvers, with the capability of expanding the display of the current segment (e.g., using a soft button or a touchscreen icon) to access more detailed instructions. Moreover, an embodiment of a navigation system may include smart learning functionality that enables it to dynamically react to driving patterns, driving habits, traffic trends, and/or user interaction with the system, where such dynamic reaction results in automatic changes to one or more operating characteristics of the navigation system. Thus, the system can learn areas and roadways that a user frequents to better present the navigation instructions in an intelligent and useful manner with little to no annoyance to the driver.

Turning now to the figures, FIG. 1 is a schematic representation of an embodiment of a navigation system 100, which is suitably configured to instruct an operator. For this example, the system 100 is deployed onboard a host vehicle, such as an automobile. In practice, the system 100 may be implemented as part of an onboard vehicle navigation system, an onboard vehicle entertainment system, an onboard display system, an onboard vehicle instrumentation cluster, or the like. The illustrated embodiment of the system 100 includes, without limitation: a display element 102; at least one audio transducer 104 (e.g., a speaker); a user interface 106; a navigation processor 108; a resolution selection module 110; and a suitable amount of memory 112. In practice, the various components of the system 100 are coupled together in a manner that facilitates the communication of data, instructions, control signals, and possibly other signals. In practice, the system 100 may include additional components configured to perform conventional functions that are unrelated to the subject matter described here.

Generally, the navigation processor 108 is configured to perform or otherwise support the various operations and functions described herein. The navigation processor 108 may include one processor device or a plurality of cooperating processor devices. Moreover, the navigation processor 108 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The memory 112 accommodates the saving and storing of data, software program code, and other information used to support the operation of the system 100. The memory 112 may be realized as RAM memory, flash memory, EPROM memory, EEPROM memory, registers, a hard disk, a removable disk, a CD-ROM, or any other form of storage medium known in the art. The memory 112 can be coupled to other elements of the system 100 to support the reading of information from, and the writing of information to, the memory 112. In certain embodiments, the memory 112 is integral to the navigation processor 108. For example, the navigation processor 108 and the memory 112 may reside in an ASIC or be implemented with a system on a chip.

For this embodiment of the system 100, the navigation processor 108 obtains location data 114 from an appropriate source that provides data indicative of the current vehicle location or position. In one practical embodiment, the location data source is realized as an onboard GPS receiver/processor that derives the current geographic position of the vehicle from GPS data received by the vehicle in real-time or substantially real-time.

The navigation processor 108 is also configured to obtain map data 116 from an appropriate source that provides data indicative of current cartographic, topological, location, road, and possibly other data useful to the system 100. The map data 116 can represent locally stored, cached, downloaded, or accessible information, which can be processed by the navigation processor 108. For example, in a fully onboard implementation, the map data source(s) may be realized as one or more hard disks, semiconductor memory devices, portable storage media, or the like. In an alternate embodiment, the map data source(s) may be realized as an onboard memory cache that temporarily stores the map data 116 that is downloaded from remote databases.

The display element 102, the audio transducer 104, and the user interface 106 may be configured in accordance with conventional vehicle navigation, information, or instrumentation systems to enable onboard interaction with the vehicle operator. The display element 102 may be a suitably configured LCD, plasma, CRT, or head-up display, which may or may not be utilized for other vehicle functions. In accordance with known techniques, an appropriate display driver of the system 100 can provide rendering control signals to the display element 102 to cause the display element 102 to render and present maps, proposed routes, roads, navigation direction arrows, and other graphical representations, elements, or indicia as necessary to support the function of the system 100. As used here, the display element 102 represents one suitable embodiment of a presentation element or device for the navigation system 100, which can be used to display graphical representations of navigation instructions to the operator.

The audio transducer 104 may be devoted to the system 100, may be realized as part of the audio system of the vehicle, or may be realized as part of another system or subsystem of the vehicle. Briefly, the audio transducer 104 may receive audio signals from the navigation processor 108, and generate corresponding audible representations of navigation instructions, user prompts, warning signals, and other sounds as necessary to support the function of the system 100. Accordingly, the audio transducer 104 represents another suitable embodiment of a presentation element or device for the navigation system 100, which can be used to provide audible navigation instructions to the operator.

The user interface 106 is configured to allow the vehicle operator to enter data and/or control the functions and features of the system 100. For example, the operator can manipulate the user interface 106 to enter a starting location and a destination location for the vehicle, where the starting and destination locations are utilized by the system 100 for purposes of route planning. If the desired starting location corresponds to the current vehicle location, then the operator need not enter the starting location if the system 100 includes a source of current vehicle position information. The user interface 106 may be realized using any conventional device or structure, including, without limitation: a keyboard or keypad; a touch screen (which may be incorporated into the display element 102); a voice recognition system; a cursor control device; a joystick or knob; or the like.

The resolution selection module 110 may be realized as a distinct element of the navigation system 100 that is coupled to the navigation processor 108. Alternatively, the resolution selection module 110 could be fully or partially incorporated into the navigation processor 108. The resolution selection module 110 includes or executes certain functions and operations related to the selection of one or more operating characteristics of the system 100, where the operating characteristic(s) control, dictate, or otherwise influence the manner in which the system provides navigation instructions to the operator. In certain embodiments, the system 100 supports a plurality of different settings or configurations for a variable operating characteristic, and the resolution selection module 110 selects one of the plurality of different settings or configurations, as described in more detail herein.

In certain embodiments, the selectable operating characteristic is associated with the amount of detail or resolution conveyed in the navigation instructions presented by the system 100. Thus, the resolution selection module 110 might select from a plurality of different cartographic resolutions, from a plurality of different roadway resolutions, from a plurality of different geographic resolutions, or the like. As used here, a higher cartographic, roadway, or geographic resolution corresponds to more detail, relatively specific driving instructions, the identification of more landmarks and geographic features, and/or (typically) a greater number of navigation instructions provided for a designated route. In contrast, a lower cartographic, roadway, or geographic resolution corresponds to less detail, relatively general driving instructions, the identification of less landmarks and geographic features, and/or (typically) a lesser number of navigation instructions provided for a designated route.

The concept of cartographic resolution will be further explained with reference to the following exemplary and non-limiting examples. High cartographic resolution may, for example, be used to provide turn-by-turn and street-by-street navigation instructions, along with notifications regarding upcoming streets and/or landmarks. Low cartographic resolution may, for example, be used to present general guidance that need not be turn-by-turn specific. In this regard, low cartographic resolution might be used to generate navigation instructions such as the following: "Take Interstate 405 North" or "Drive to the San Diego Area" or "Proceed Home." Intermediate cartographic resolution may, for example, be used to present navigation instructions that concentrate on major arteries, large streets, or highways, and without specifying turn-by-turn maneuvers. In this regard, intermediate cartographic resolution could be used to generate navigation instructions such as the following: "Turn Left at Broadway, Then Take Interstate 101 South" or "Turn Right on Route 44, and Proceed to Main Street."

In certain embodiments, the resolution selection module 110 (and/or other processing logic in the navigation system 100) monitors driving trends of the host vehicle and/or monitors user interaction with the navigation system 100 and, in response to such monitoring, automatically selects the cartographic resolution. Thus, the resolution selection module 110 can be suitably configured to analyze monitored driving trends and/or monitored user interaction, and automatically select or recommend a cartographic resolution for the navigation instructions, as a function of the monitored driving trends and/or user interaction. As used here, a monitored driving trend may be, without limitation: how often the vehicle travels on a monitored roadway, highway, freeway, path, route, or segment thereof, the amount of time the vehicle spends traveling on a monitored roadway, highway, freeway, path, route, or segment thereof, how often the vehicle visits a monitored geographic area (which may be defined in any number of ways—e.g., zip code, area code, county line, city limits, distance from a predetermined location); the amount of time the vehicle spends in a monitored geographic area; whether the vehicle tends to use smaller roadways or larger roadways; whether the vehicle tends to travel on relatively low traffic roadways or relatively high traffic roadways; the average speed of the vehicle; the amount of driving maneuvers per unit of time or unit of distance; or the like. As used here, monitored user interaction may be associated with certain user-initiated commands and operations such as, without limitation: enabling/disabling the navigation system 100; enabling/disabling voice prompts; changing (increasing or decreasing) the recommended or default cartographic resolution; the frequency with which the user activates the navigation system 100; the amount of time the navigation system 100 has been used to provide guidance; whether or not the user has missed a number of maneuvers; the user's identity (applicable when the navigation system supports different users); or the like.

The navigation system 100 can perform a number of navigation functions, operations, processes, and methods, which are described in more detail herein. Typically, the system 100 generates and presents guidance information and instructions associated with a proposed or default route to a destination. In addition, the system 100 is able to vary and change the level of detail associated with the navigation instructions it presents to the operator of the vehicle. Certain features of the navigation system 100 are described below with reference to processes depicted in FIGS. 2, 7, and 8. The various tasks performed in connection with a described process may be performed by software, hardware, firmware, or any combination thereof. For illustrative purposes, the following description may refer to elements mentioned above in connection with FIG. 1. In practice, portions of a described process may be performed by different elements of the described system, e.g., the navigation processor, the memory element, the display element, the selection module, or the like. It should be appreciated that a given process may include any number of additional or alternative tasks, the tasks shown in the figures need not be performed in the illustrated order, and a described process may be incorporated into a more comprehensive procedure or process having additional functionality not described in detail herein. Moreover, in some embodiments, one or more of the illustrated tasks may be omitted.

Figure 2:
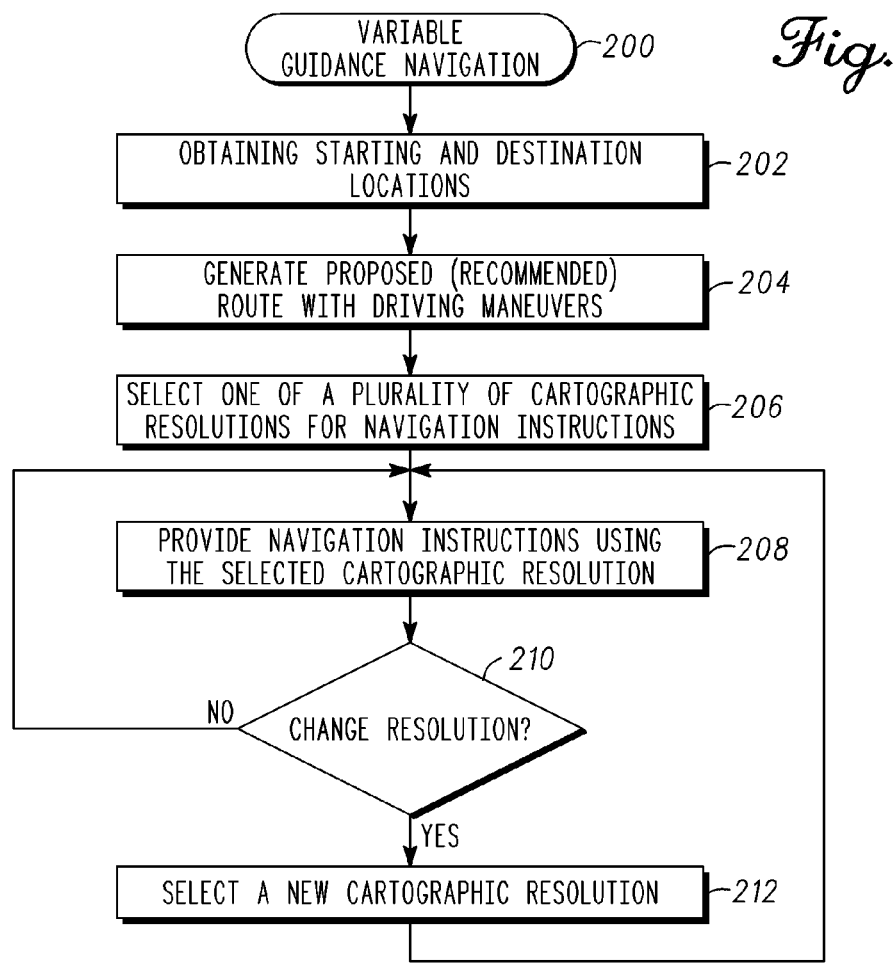
FIG. 2 is a flow chart that illustrates an embodiment of a variable guidance navigation process.

FIG. 2 is a flow chart that illustrates an embodiment of a variable guidance navigation process 200. The process 200 may be performed by, for example, the navigation system 100. The process 200 may begin by obtaining a starting location and a destination location for the vehicle (task 202). The starting and destination locations may be utilized to determine one or more potential routes or potential route sections to be recommended for travel to the destination location. Next, the process 200 generates a proposed route to the destination location (task 204). The proposed route generated during the task 204 can be defined by one or more nodes or driver decision points, along with their associated driving maneuvers. This proposed route can be saved for use as the default route. In some embodiments, the process 200 may generate more than one proposed route for selection by the vehicle operator.

The illustrated embodiment of the process 200 continues by selecting a cartographic resolution from a plurality of different available cartographic resolutions (task 206). This selected cartographic resolution may be considered to be the initial or default cartographic resolution for purposes of this description. Task 206 can be implemented in a variety of different ways, depending upon the particular embodiment, the user preferences, the current state of the navigation system, and the like. For example, the same default cartographic resolution could be selected whenever the navigation system is activated. Alternatively, the operator may be prompted to manually select a desired cartographic resolution. In certain embodiments, the initial cartographic resolution can be selected as a function of historical data or information collected by the navigation system. For example, the initial cartographic resolution might be selected as a function of monitored driving trends and/or as a function of monitored user interaction with the navigation system itself.

Figure 3:
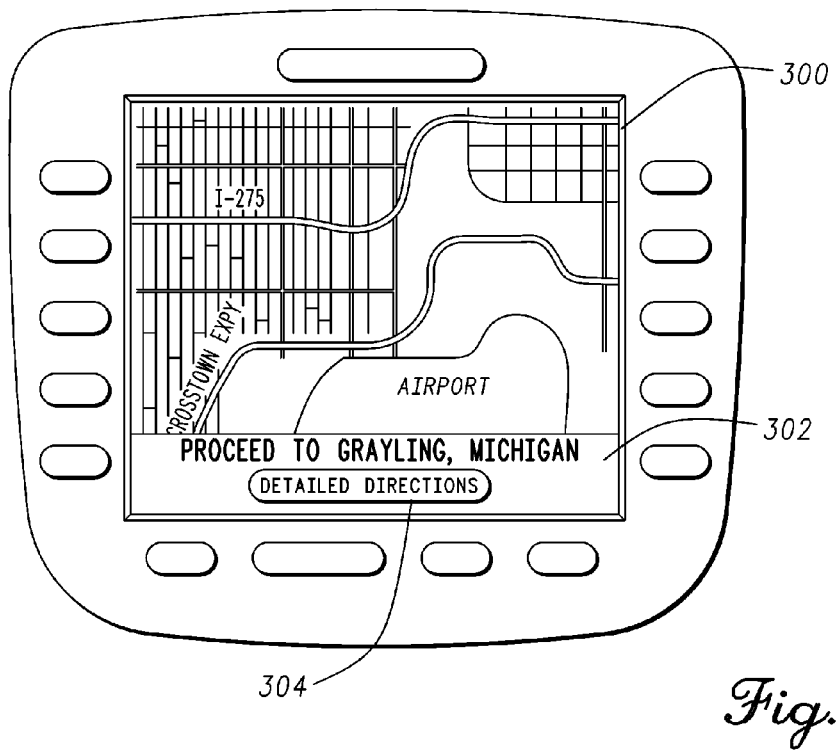
FIGS. 3-6 are schematic representations of exemplary displays generated by a vehicle navigation system.

After the initial cartographic resolution is selected, the process 200 provides navigation instructions for the proposed route, using the selected cartographic resolution (task 208). The process 200 will provide navigation instructions to the vehicle operator in an ongoing manner, as is understood by those familiar with vehicle navigation systems. The navigation instructions may be realized as graphical reminders, audible warnings or instructions, or the like. In practice, navigation instructions will be presented at the initial cartographic resolution for at least one segment of the proposed route. Although not required, this particular example assumes that the initial cartographic resolution is a low resolution. In other words, task 208 may present general navigation instructions (visual and/or audible) with little to no turn-by-turn guidance. In this regard, FIG. 3 is a schematic representation of an exemplary display 300 generated by a vehicle navigation system, where the display 300 renders navigation instructions 302 using the low cartographic resolution. In this example, the navigation instructions 302 simply indicate that the driver should "Proceed to Grayling, Mich." Such low resolution instructions are appropriate when the driver is at least somewhat familiar with the area and already knows how best to head toward Grayling, Mich. Accordingly, detailed turn-by-turn or high resolution (street-by-street) instructions need not be provided.

Referring back to FIG. 2, the navigation system continues to generate navigation instructions at the initial cartographic resolution until it detects a command, situation, condition, or other triggering event that causes the process 200 to change the cartographic resolution (query task 210). If a change is needed, then the process 200 can select a new cartographic resolution from the plurality of available resolutions (task 212) and thereafter provide navigation instructions using the newly selected cartographic resolution (task 208). In practice, the query task 210 may be associated with any number of triggering events. For example, when the system is operating in the low cartographic resolution mode, it could monitor whether the vehicle is traveling in the general direction of the intended destination. Then, if the system detects that the vehicle is heading significantly in the wrong direction, then it could switch to the high cartographic resolution mode to provide additional navigation assistance to the operator. As another example, the navigation system might detect user interaction with the user interface, where such user interaction represents a command to change the cartographic resolution. In this regard, the display 300 depicted in FIG. 3 includes a graphical button 304 (which may represent a soft button and/or a touch screen button) that can be activated by the user to switch resolutions or modes. As shown in FIG. 3, the graphical button 304 may include appropriate text, such as "Detailed Directions." Alternatively (or additionally), the initial cartographic resolution may be automatically changed in response to monitored driving trends and/or in response to monitored user interaction with the navigation system. These aspects of the navigation system are described in more detail below with reference to FIG. 7 and FIG. 8.

Figure 4:
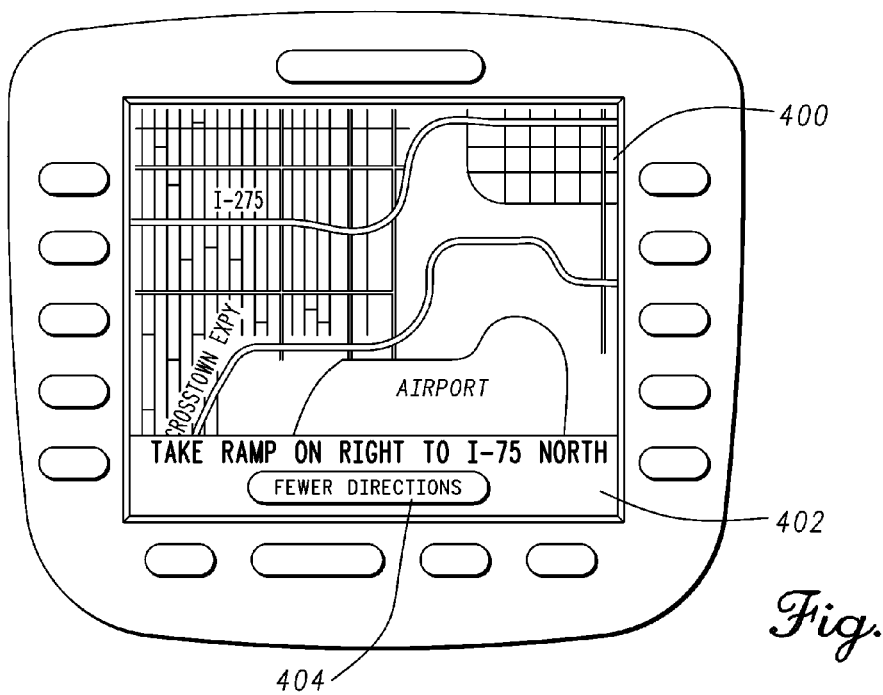

Selection of the new cartographic resolution results in the presentation of navigation instructions at the new cartographic resolution for at least one following segment of the proposed route. Although not required, this particular example assumes that the newly selected cartographic resolution is a high resolution. Thus, the navigation system presents detailed navigation instructions (visual and/or audible), with possibly more street-by-street or turn-by-turn guidance. In this regard, FIG. 4 is a schematic representation of an exemplary display 400 generated by a vehicle navigation system, where the display 400 renders navigation instructions 402 using the high cartographic resolution. In this example, the navigation instructions 402 provide specific driving instructions that indicate that the driver should "Take Ramp on Right to I-75 North." The display 400 depicted in FIG. 4 also includes a graphical button 404 (which may represent a soft button and/or a touch screen button) that can be activated by the user to switch resolutions or modes. As shown in FIG. 4, the graphical button 404 may include appropriate text, such as "Fewer Directions."

Figure 5:
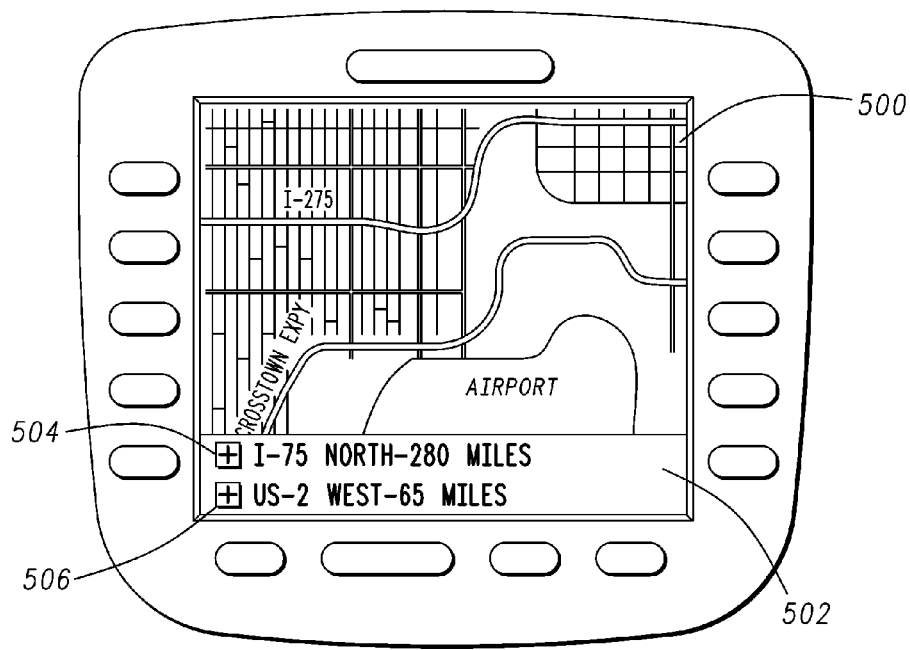
Figure 6:
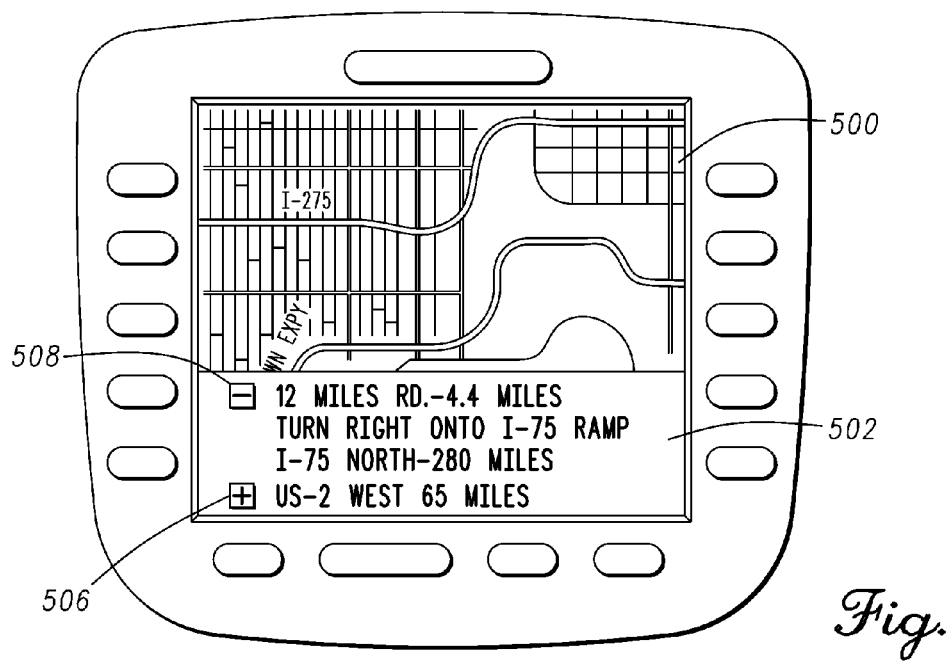

FIG. 5 and FIG. 6 are schematic representations of other exemplary displays, which might be generated by a vehicle navigation system such as the system 100. FIG. 5 depicts a display 500 that includes navigation instructions 502 at a low resolution. The navigation instructions 502 specify two sequential low-resolution instructions: "I-75 North—280 Miles" followed by "US-2 West—65 Miles." Thus, a driver familiar with these highways will be able to follow such general instructions without difficulty. The exemplary display 500 depicted in FIG. 5 also contains graphical representations of expand buttons 504/506 near each individual navigation instruction. The expand buttons 504/506 (which may be realized as soft buttons and/or touch screen buttons) can be activated by the user to expand the respective navigation instructions and provide additional detail if available.

FIG. 6 depicts the display 500 after the expand button 504 has been activated. Accordingly, the expand button 504 has been replaced with a contract button 508. Notably, the previous navigation instruction "I-75 North—280 Miles" has been supplemented with high resolution instructions. For this example, the high resolution instructions now recite the following in sequence: "12 Mile Rd—4.4 Miles" and "Turn Right onto I-75 Ramp" and "I-75 North—280 Miles." These high resolution instructions can be helpful to a driver who is unfamiliar with the area. The contract button 508 can be activated to switch back to the low resolution navigation instruction depicted in FIG. 5.

Figure 7:
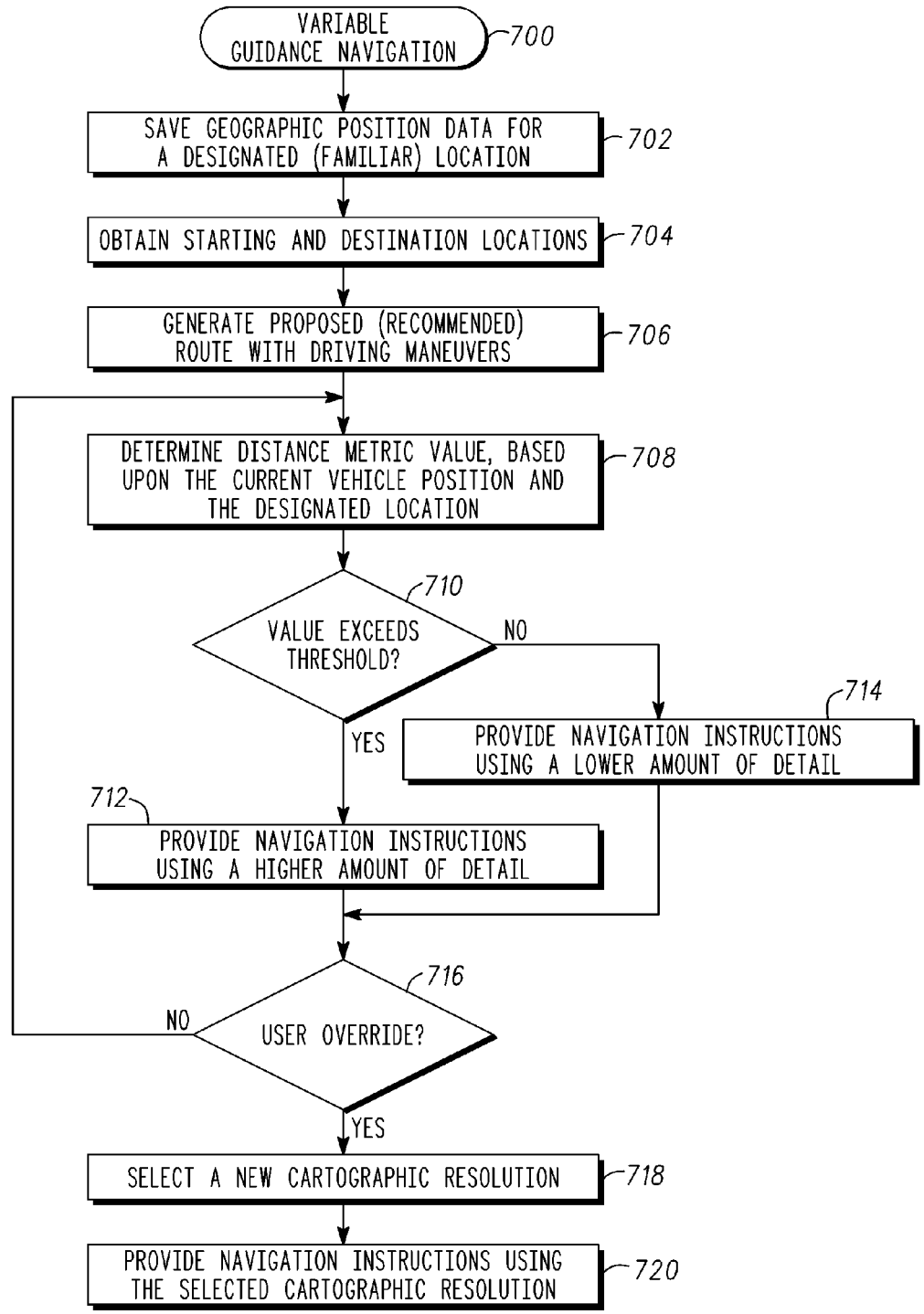
FIG. 7 is a flow chart that illustrates another embodiment of a variable guidance navigation process.

As mentioned previously, certain embodiments of the navigation system 100 may be suitably configured to dynamically select the cartographic resolution used for navigation instructions. FIG. 7 is a flow chart that illustrates another embodiment of a variable guidance navigation process 700 that performs such dynamic selection. In connection with the process 700, the navigation system saves geographic position data (e.g., GPS data) for a designated location, region, area, landmark, or the like (task 702). Although this designated location need not have any particular significance, in practice it will typically be a location that is familiar to the operator. For instance, the designated location may be the home or office of the operator. Task 702 can be performed at any time prior to navigation, and task 702 could be performed any number of times to save multiple "familiar" locations if desired.

The process 700 may proceed by obtaining a starting location and a destination location for the vehicle (task 704), and by generating a proposed route to the destination location (task 706), as described above for the process 200. The illustrated embodiment of the process 700 determines a distance metric value that is indicative of the proximity between the current vehicle position and at least one designated (familiar) location (task 708). In practice, the task 708 could analyze the current GPS location of the vehicle and the GPS location of the designated location(s) to determine whether or not the vehicle is in an area or region that is familiar to the driver. As used here, the distance metric may be indicative of any appropriate measure or geographic boundary, including, without limitation: a distance measurement (e.g., miles); a zip code; an area code; city, county, state, or country boundaries; neighborhood boundaries; drive time; frequency of travel on the roadway; or the like.

The calculated distance metric value can then be compared to any suitable criteria, such as a threshold value (query task 710). Although not a requirement, this example assumes that a higher distance metric value indicates that the vehicle is relatively far away from the designated location and, therefore, the operator might be relatively unfamiliar with the area. Conversely, this example assumes that a lower distance metric value indicates that the vehicle is relatively close to the designated location and, therefore, the operator might be relatively familiar with the area. Under these assumptions, this embodiment of the process 700 provides navigation instructions using more detail (i.e., at a higher cartographic resolution) when the measured distance metric value exceeds the threshold value (task 712). On the other hand, this embodiment of the process 700 provides navigation instructions using less detail (i.e., at a lower cartographic resolution) when the measured distance metric value does not exceed the threshold value (task 714). This selection of the currently active cartographic resolution can be performed automatically and dynamically by the navigation system.

An embodiment of the navigation system may allow the user to override the selected cartographic resolution. Accordingly, if the process 700 detects a user override command (query task 716), then a new cartographic resolution can be selected (task 718). Thereafter, the navigation system will provide navigation instructions using the operator-selected cartographic resolution (task 720). If the query task 716 does not detect a user override command, then the process 700 may exit or be reentered at an appropriate location, such as task 708. In this manner, the process 700 can be iteratively performed to dynamically update and change the cartographic resolution as the vehicle traverses the proposed route. Thus, the navigation system can present fewer and less specific instructions as the vehicle approaches a designated (familiar) location, and it can present additional and more specific instructions if the vehicle remains in an unfamiliar area.

Figure 8:
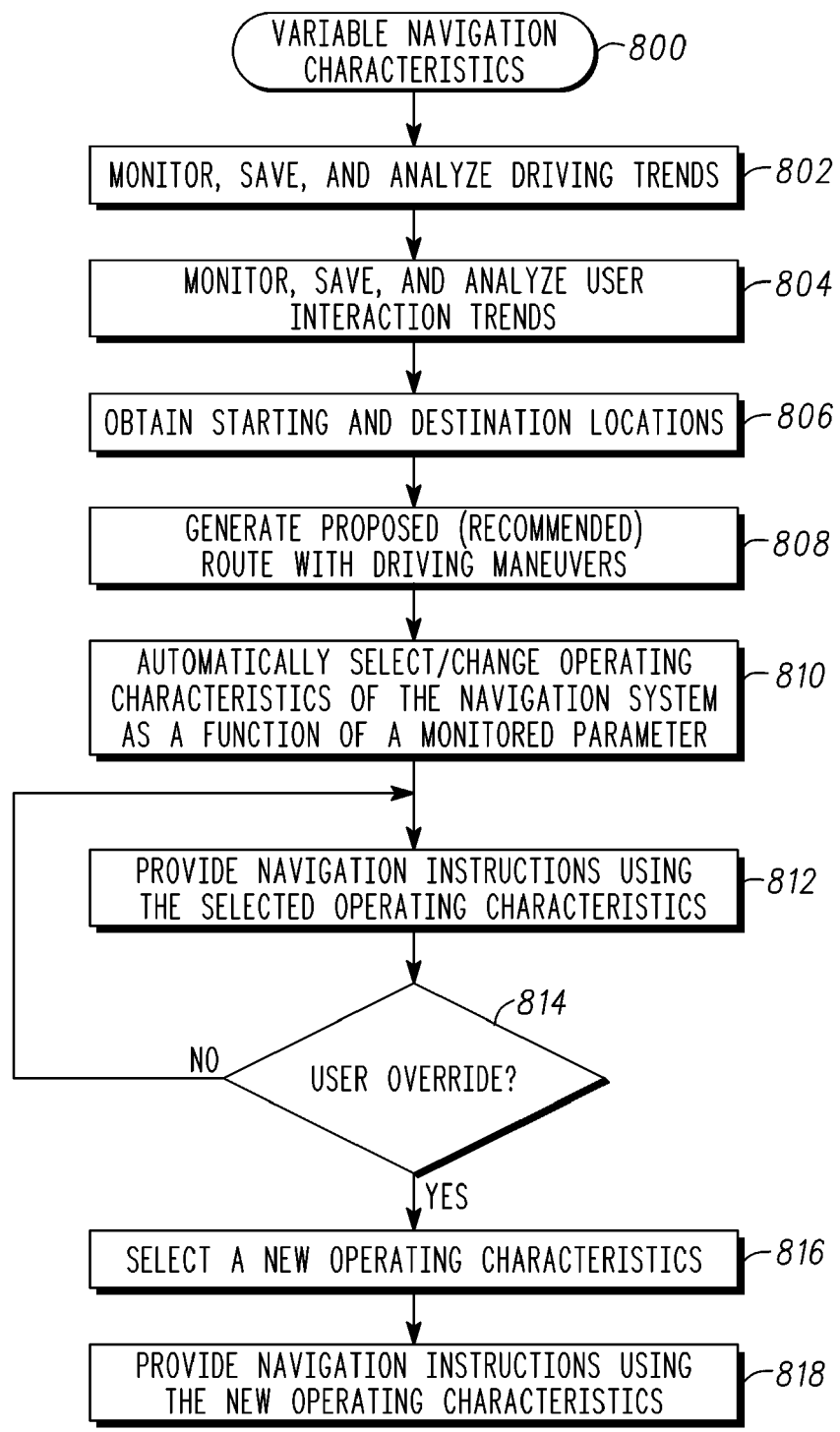
FIG. 8 is a flow chart that illustrates an embodiment of a variable navigation characteristics process.

As mentioned previously, certain embodiments of the navigation system 100 may be suitably configured to automatically select the cartographic resolution used for navigation instructions in response to historical driving and/or usage trends. FIG. 8 is a flow chart that illustrates an embodiment of a variable navigation characteristics process 800 that performs such automatic selection.

In connection with the process 800, the navigation system monitors, saves, and analyzes driving trends of the vehicle (task 802) and/or monitors, saves, and analyzes user interaction trends (task 804). The above description of the resolution selection module 110 (FIG. 1) includes some examples of driving trends and user activity that might be monitored by the navigation system. Tasks 802 and 804 can be performed at any time prior to, during, or even after navigation, and these tasks could be performed in an ongoing and dynamic manner as needed.

When used for navigation guidance, the process 800 obtains a starting location and a destination location for the vehicle (task 806), and then generates a proposed route to the destination location (task 808), as described above for the process 200. The process 800 may proceed by automatically selecting or changing certain operating characteristics of the navigation system as a function of a monitored parameter (task 810). The exemplary embodiment described here automatically selects one of a plurality of different cartographic resolutions, which will be used to present navigation instructions at an appropriate level of detail. Accordingly, the process 800 provides navigation instructions to the operator in accordance with the automatically selected operating characteristic (task 812).

An embodiment of the navigation system may allow the user to override the selected operating characteristic (or characteristics). Accordingly, if the process 800 detects a user override command (query task 814), then one or more new operating characteristics can be selected (task 816). Thereafter, the navigation system will provide navigation instructions using the operator-selected operating characteristics (task 818). If the query task 814 does not detect a user override command, then the process 800 may exit or be reentered at an appropriate location, such as task 812. Thus, the process 800 will continue using the automatically selected operating characteristic (e.g., a particular cartographic resolution) unless the operator overrides the automatic selection.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A navigation method for instructing an operator of a vehicle with a navigation system, the method comprising:
   automatically monitoring driving trends via a processor on the vehicle to define familiar areas and unfamiliar areas;
   obtaining a destination location;
   generating a proposed route to the destination location;
   providing more detailed navigation instructions for an unfamiliar area included in the proposed route, using a first cartographic resolution, wherein the first cartographic resolution corresponds to a higher amount of detail; and
   providing less detailed navigation instructions for a familiar area included in the proposed route, using a second cartographic resolution that is different than the first cartographic resolution, wherein the less detailed cartographic resolution corresponds to a lower amount of detail.

2. The method of claim 1, wherein:
   the step of providing more detailed navigation instructions comprises providing more detailed navigation instructions for the unfamiliar area included in the proposed route, using the first cartographic resolution, wherein the first cartographic resolution corresponds to a higher amount of road detail.

3. The method of claim 1, wherein:
   the step of providing more detailed navigation instructions comprises providing more detailed navigation instructions for the unfamiliar area included in the proposed route, using the first cartographic resolution, wherein the first cartographic resolution corresponds to a higher amount of geographic detail.

4. The method of claim 1, further comprising:
   determining a distance metric value that is indicative of proximity between the vehicle and the familiar location; wherein
   the step of providing less detailed navigation instructions is performed when the distance metric value exceeds a threshold value; and
   the step of providing more detailed navigation instructions is performed when the distance metric value does not exceed the threshold value.

5. The method of claim 1, further comprising:
   determining a distance metric value that is indicative of proximity between the vehicle and the familiar location; wherein
   the step of providing more detailed navigation instructions is performed when the distance metric value exceeds a threshold value; and
   the step of providing less detailed navigation instructions is performed when the distance metric value does not exceed the threshold value.

6. The method of claim 1, further comprising:
   providing navigation instructions in accordance with the selected cartographic resolution.

7. The method of claim 1, further comprising:
   monitoring user interaction with the navigation system;
   automatically selecting the more detailed cartographic resolution or the less detailed cartographic resolution as a function of monitored user interaction, resulting in a selected cartographic resolution; and
   providing navigation instructions in accordance with the selected cartographic resolution.

8. A navigation method for instructing an operator of a vehicle with a navigation system, the method comprising:
   automatically monitoring driving trends via a processor on the vehicle to obtain monitored driving trends;
   automatically changing the degree of detail for navigation instructions generated by the navigation system as a function of the monitored driving trends, resulting in an automatically selected degree of detail; and
   providing navigation instructions in accordance with the automatically selected degree of detail.

9. The method of claim 8, further comprising monitoring user interaction with the navigation system, wherein the step of automatically changing the degree of detail comprises automatically changing the degree of detail as a function of the monitored driving trends and monitored user interaction.

10. The method of claim 8, wherein the degree of detail is associated with a roadway resolution utilized by the navigation system for providing navigation instructions, and wherein the method further comprises:
    obtaining a destination location;
    generating a proposed route to the destination location; and
    providing navigation instructions for the proposed route, using one of a plurality of different roadway resolutions.

11. The method of claim 8, wherein the step of monitoring driving trends comprises determining how often the vehicle travels on monitored roadways.

12. The method of claim 8, wherein the step of monitoring driving trends comprises determining an amount of time the vehicle spends in geographic areas.

13. The method of claim 8, wherein the step of monitoring driving trends comprises determining whether the vehicle is traveling on relatively low traffic roadways or relatively high traffic roadways.

14. A navigation system for instructing an operator of a vehicle, the navigation system comprising:
    a navigation processor configured to obtain a destination location, and to generate a proposed route to the destination location, wherein the proposed route includes an unfamiliar area and a familiar area;
    a presentation element coupled to the navigation processor, the presentation element configured to provide navigation instructions to the operator; and
    a selection module coupled to or incorporated into the navigation processor, and configured to select a cartographic resolution from a more detailed cartographic resolution having a higher amount of detail and a less detailed cartographic resolution having a lower amount of detail, resulting in a selected cartographic resolution; wherein:
    the selection module is configured to select the more detailed cartographic resolution for the unfamiliar area and to select the less detailed cartographic resolution for the familiar area; and
    the presentation element provides navigation instructions for at least a portion of the proposed route, using the selected cartographic resolution.

15. The navigation system of claim 14, wherein:
the presentation element comprises a display element; and
the display element is configured to display graphical representations of the navigation instructions in accordance with the selected cartographic resolution.

16. The navigation system of claim 14, wherein:
the presentation element comprises an audio transducer; and
the audio transducer is configured to generate audible representations of the navigation instructions in accordance with the selected cartographic resolution.

17. The navigation system of claim 14, wherein the more detailed cartographic resolution has a higher amount of road detail and the less detailed cartographic resolution has a lower amount of road detail.

18. The navigation system of claim 14, wherein the more detailed cartographic resolution has a higher amount of geographic detail and the less detailed cartographic resolution has a lower amount of geographic detail.

19. The navigation system of claim 14, wherein the selection module is configured to monitor driving trends of the vehicle to define familiar areas and unfamiliar areas.

20. The navigation system of claim 14, wherein the selection module is configured to monitor interaction with the navigation system by the operator of the vehicle to define familiar areas and unfamiliar areas.

* * * * *